United States Patent [19]

Chiddick

[11] Patent Number: 5,308,516
[45] Date of Patent: *May 3, 1994

[54] FRICTION MODIFIERS

[75] Inventor: Kelvin S. Chiddick, North Vancouver, Canada

[73] Assignee: Century Oils, Inc., Langley, Canada

[ * ] Notice: The portion of the term of this patent subsequent to Dec. 22, 2009 has been disclaimed.

[21] Appl. No.: 886,615

[22] Filed: May 20, 1992

Related U.S. Application Data

[63] Continuation-in-part of Ser. No. 769,578, Oct. 2, 1991, Pat. No. 5,173,204, which is a continuation of Ser. No. 492,815, Mar. 13, 1990, abandoned, which is a continuation-in-part of Ser. No. 364,453, Jun. 8, 1989, abandoned.

[30] Foreign Application Priority Data

May 21, 1991 [GB] United Kingdom ............... 9110979

[51] Int. Cl.$^5$ ................. C10M 111/04; C10M 169/04
[52] U.S. Cl. ........................................ 252/30; 252/25; 252/27; 252/28; 252/18
[58] Field of Search ............ 252/18, 25, 30, 27, 252/28

[56] References Cited

U.S. PATENT DOCUMENTS

| | | |
|---|---|---|
| 2,860,111 | 11/1958 | Rolle . |
| 3,198,735 | 8/1965 | Lamson et al. . |
| 3,537,997 | 11/1970 | Wright . |
| 3,839,208 | 10/1974 | Hermann . |
| 3,935,114 | 1/1976 | Donaho, Jr. . |
| 3,965,016 | 6/1976 | Soulen . |
| 4,329,238 | 5/1982 | Mitrofanova et al. . |
| 4,473,481 | 9/1984 | Fukutsuka et al. . |
| 4,534,871 | 8/1985 | Johnson . |
| 4,557,839 | 12/1985 | Tubbs et al. . |
| 4,715,972 | 12/1987 | Pacholke . |
| 4,735,734 | 4/1988 | Staub et al. . |
| 4,811,818 | 3/1989 | Jamison . |
| 4,915,856 | 4/1990 | Jamison . |
| 5,173,204 | 12/1992 | Chiddick .................. 252/30 |

FOREIGN PATENT DOCUMENTS

| | | |
|---|---|---|
| 927370 | 5/1973 | Canada . |
| 0372559 | 6/1990 | European Pat. Off. . |
| 2207146A | 1/1989 | United Kingdom . |
| 2223504A | 4/1990 | United Kingdom . |
| 2207146 | 7/1991 | United Kingdom . |

OTHER PUBLICATIONS

Patent Abstracts of Japan, vol. 3, No. 118, 4 Oct. 1979 & JP, A, 5496556 (Teijn K.K.), 31 Sep. 1979.
U.S. Search Report.
A Low–Velocity Friction Machine For The Studies Of Static And Dynamic Frictions–With Special References To The Evaluation Of Slide And Way Oils, Controlled Technical Report, 1985.
Lateral Creepage and Its Effect on Wear in Rail Wheel Interface, Kalousek, et al., University of Waterloo Press, Vancouver, BC, Jul. 6-9, 1982.
Wheel/Rail Squeal and Imprsct Noise, P. J. Remington, Journal of Sound and Vivration, 1985, 116(2), 339-353.
Mechanical and Tribochemical Research on Two Newly Developed Rolling Friction Test Rigs at the Technical University of Berlin, Germany, University of Waterloo Press, Vancouver, BC, Jul. 6-9, 1982.

Primary Examiner—Jacqueline V. Howard
Attorney, Agent, or Firm—Dority & Manning

[57] ABSTRACT

Friction modifiers are composition which modify the coefficient of friction between surfaces to which the friction modifier is applied. They are similar in nature to lubricants but have different characteristics in certain respects. The invention relates particularly to solid friction modifiers which may be rigid or flexible. These friction modifiers comprise 20–80% by weight of a polymer medium, 5–20% by weight of a solid lubricant and 15–60% by weight of a friction enhancer. The composition produces a coefficient of friction which rises to above 0.20 at creepage level up to 2.5% between steel bodies in rolling-sliding contact lubricated using the composition.

21 Claims, 1 Drawing Sheet

FRICTION MODIFIERS

This is a continuation-in-part application of United States application Ser. No. 07/769,578, filed Oct. 2, 1991, now U.S. Pat. No. 5,173,204 which was a continuation application of United States application Ser. No. 07/492,815 filed Mar. 13, 1990, now abandoned, which was a continuation-in-part application of United States application Ser. No. 07/364,453 filed Jun. 8, 1989, now abandoned.

This invention relates to friction modifier compositions. Friction modifiers are compositions which modify the coefficient of friction between surfaces to which the friction modifier is applied. They are similar in nature to lubricants but have different characteristics in certain respects. The invention relates particularly to solid friction modifiers which may be rigid or flexible.

BACKGROUND AND PRIOR ART

Many steel rail-wheel transportation systems including freight, passenger and mass transmit systems suffer from the emission of high noise levels which cause a nuisance to persons dwelling close to such systems. The origin of such noise emission can be directly attributed to the fact that under certain conditions arising in use, the wheels of such systems do not always roll over the rails but sometimes slide relative to them. This arises, for example, when negotiating curves where true rolling contact could only be maintained on both rails if inner and outer wheels could rotate at different peripheral speeds. As this is not possible on fixed axle traction or rolling stock, the wheels undergo a combined rolling and sliding movement relative to the associated rails. Sliding movement also arises on inclines where a point may be reached at which traction is lost causing driving wheels to slip. When negotiating curves and inclines therefore the wheels, particularly of the traction vehicle, undergo alternate rolling and sliding motions, this phenomenum being referred to as "slip-stick". The magnitude and speed of the sliding movement is dependent on the difference, expressed as a percentage, between the rail and wheel velocities at the point of contact. This percentage difference is termed creepage.

Apart from generation of noise, creepage also produces wear both of the wheels and of the rails. This wear is accentuated by persistent to and fro movement which results from the presence of clearances necessary to enable the train to move over the track. These effects together produce undulatory wave patterns on the rail surfaces which are generally referred to as corrugations. When this occurs the noise levels are increased beyond those for a smooth rail/wheel interface and ultimately the problem can only be cured by grinding or machining the rail and wheel surfaces. This is both time consuming and expensive and requires to be carried out periodically as corrugations again build up over time.

At creepage levels larger than about 1% appreciable frictional forces are generated due to sliding. One means of improving the situation would be to reduce the extent to which creepage occurred by increasing friction between rail and wheel before slipping takes place. This is particularly applicable in relation to slippage arising through gradients in the track, but creepage arising from the behaviour of solid axle wheel sets on bends cannot be eliminated in this way and can therefore only be reduced by lubrication control. However conventional lubrication which serves simply to reduce frictional resistance between rail and wheel can interfere with traction, deceleration and braking. There is accordingly a conflicting requirement on the one hand to increase friction to reduce slipping or creepage and on the other hand to reduce wear by lubrication control.

In International Patent Application No. PCT/GB90/00878 published under No. WO 90/15123, there is disclosed a lubricant composition having a high and positive coefficient of friction, that is having the property whereby, contrary to conventional lubricants, the coefficient of friction between the lubricated surfaces increases with speed of relative sliding movement. The composition disclosed in the aforesaid International Application is designed primarily to reduce wear arising from the slip-stick effect although contrary to conventional lubricants it produces an increase in frictional force as slippage occurs.

While this composition is extremely effective in responding to slippage as it occurs, it places less emphasis on the prevention of slippage in the first place. We have now found that it is possible to provide a friction modifier which is particularly effective in countering the occurrence of slippage arising on gradients and the like while still producing lubrication effective to reduce noise and wear arising from creepage in negotiating bends in the track and from lateral oscillatory movement.

SUMMARY OF INVENTION

According to one aspect of the invention, there is provided a friction modifier producing a coefficient of friction which increases to about 0.20 at creepage levels up to 2.5% between steel bodies in rolling-sliding contact lubricated using the composition.

Preferably the composition is such that the coefficient of friction continues to increase gradually at creepage levels above 2.5% at least to 10% creepage and preferably to 30% creepage.

Preferably the composition is such that the coefficient of friction increases to above 0.40 at creepage levels up to 2.5%.

According to a further aspect of the invention there is provided a friction modifier composition comprising at least 20% by weight of a polymer medium, at least 5% by weight of a solid lubricant and at least 15% by weight of a friction enhancer.

The invention also provides a friction modifier composition comprising 20–80% by weight of a polymer medium, 5–20% by weight of a solid lubricant and 15–60% by weight of a friction enhancer, wherein the solid lubricant and the friction enhancer are present in the composition in a ratio from about 1:1.8 to about 1:3 and the composition produces a coefficient of friction which rises to above 0.20 at creepage levels up to 2.5% between steel bodies in rolling-sliding contact lubricated using the composition.

Preferrable the ratio of solid lubricant to friction enhancer is from about 1:2 to about 1:3.

In a preferred embodiment the composition comprises 40–70% by weight of polymer medium, 7.5–15% by weight of solid lubricant and 22.5–45% by weight of friction enhancer and the solid lubricant and the friction enhancer are present in the composition in a ratio of approximately 1:3.

DETAIL DESCRIPTION OF THE PREFERRED EMBODIMENTS

Figure 1:
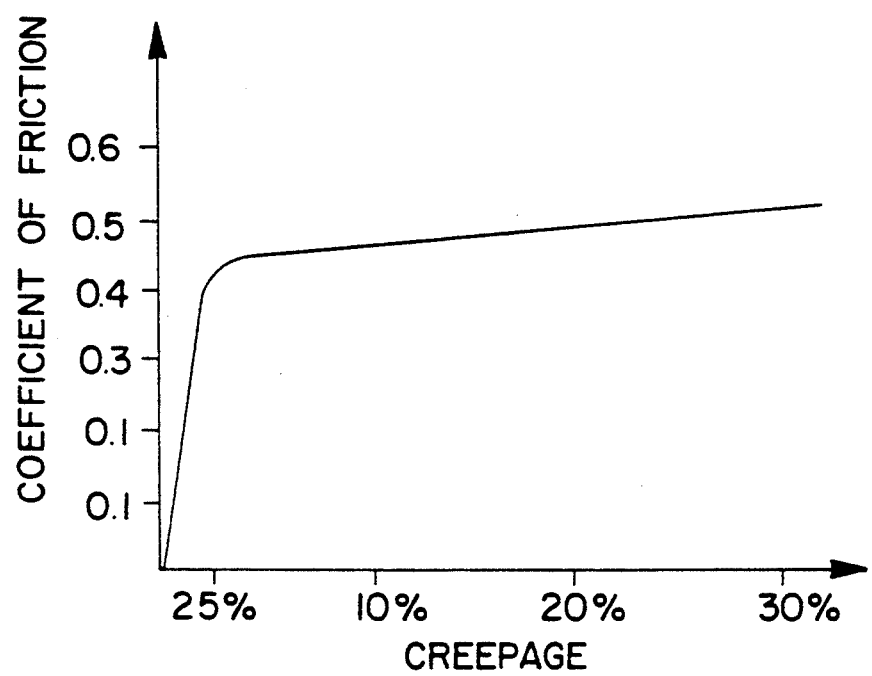
FIG. 1 shows the coefficient of friction versus creepage performance of a frictions modifier according to the invention applied to a steel wheel/rail system.

The polymer medium may be selected from the group consisting of epoxy ester resin, polyurethane resin, polyurethane-acrylic resin, polyester resin, polyethylene resin and polypropylene resin or combinations thereof.

The solid lubricant may be selected from the group consisting of molybdenum disulphide and graphite or combinations thereof.

The friction enhancer preferably comprises a powderised mineral and may be selected from the group consisting of calcium carbonate, magnesium silicate, magnesium carbonate, bentonite, coal dust, barium sulphate, asbestos, aluminium silicate, silica, amorphous silica, synthetic silica, natural silica, slate powder, diatomaceous earth, ground quartz, zinc stearate, aluminium stearate, zinc oxide, iron oxide, antimony oxide, dolomite, lead carbonate, calcium sulphate, calcium sulphate, nepthalene synemite, and powderised polyethylene fibres or combinations thereof.

The friction enhancer may have a particle size in the range of about 0.5 microns to about 5 microns, and preferably has a particle size in the range of about 1 micron to about 2 microns.

The composition preferably produces a coefficient of friction between steel bodies in rolling-sliding contact in the range zero to 0.45 as the relative speed of sliding (creepage) increases from zero to about 2.5% and a coefficient of friction in the range of about 0.45 to 0.55 as the relative speed of sliding (creepage) increases from about 2.5%–30%.

In a specific embodiment the composition comprises:
(a) about 60% by weight of a polyester resin medium;
(b) about 10% by weight of a molybdenum disulphide solid lubricant; and
(c) about 30% by weight of powderised talc (magnesium silicate) as a friction enhancer together with promoters to improve and accelerate the cure rate and gel time and polymerisation initiators.

The polyester resin medium may be orthophtalic or alternatively may be isophtalic. The composition may contain graphite instead of molybdenum disulphide solid lubricant or a combination thereof.

FIG. 1 depicts graphically the coefficient of friction versus creepage performance of a friction modifier according to the invention applied to a steel wheel/rail system showing the rapid initial increase in coefficient of friction at creepage levels below 2.5% followed by a more gradual increase at creepage levels of 2.5% to 30%.

The following examples, given by way of example only and not intended to be construed in a limitative manner, illustrate embodiments of friction modifiers according to the invention.

EXAMPLE 1

A friction modifier composition comprises:
(a) about 60% by weight of polyester resin medium;
(b) about 10% by weight of a molybbdenum disulphide solid lubricant;
(c) about 30% by weight of a powderised talc (magnesium silicant);
(d) about 0.2% promoters to improve and speed up the cure rate and gel time; and
(e) about 1.4% of polymerisation initiators.

Similar friction modifiers according to the invention can be formulated by selecting one or more media, lubricants and friction enhancers from the following:

Media

Epoxy ester resin—(amine cured & polyamide cured),
Two-pack polyurethane resin
Polyurethane-acrylic resin
Polyester resin—(including plasticized orthophthalic and isophthalic resins)
Polyethylene resin
Polypropylene resin

Solid Lubricant

Molybdenum Disulphide
Graphite

Friction Enhancer (Powder)

Whiting (Calcium Carbonate)
Magnesium Carbonate
Talc (Magnesium Silicate)
Bentonite (Natural Clay)
Coal Dust (Ground Coal)
Barytes (Barium Sulphate)
Blanc Fixe (Calcium Sulphate)
Asbestors (Asbestine derivative of asbestos)
China Clay (Aluminium Silicate)
Silica—Amorphous (Synthetic)
Naturally occurring
Slate Powder
Diatomaceous Earth
Ground Quartz (SiO)
Zinc Stearate
Aluminium Stearate
Magnesium Carbonate
White Lead (Lead Oxide)
Basic Lead Carbonate
Zinc Oxide
Antimony Oxide
Dolomite (MgCo CaCo)
Calcium Sulphate
Naphthalene Synemite
Polyethylene Fibres The composition may be prepared according to the following method. When a two component resin system is used, the two component resin is loaded into a mixing drum at room temperature. While the two component resin system is being mixed, a friction enhancer such as talc is added slowly and dispersed into the resin. The molybdenum disulphide is then added slowly to the mixture and dispersed into the resin. When the components are thoroughly mixed, they are pumped into a milti-shot mixing head at which a catalyst is added. Typical catalysis are methylethylketone peroxide, and n, n-dimethylamine and cobalt naphthenate. The ratios of the two are adjusted to control the setting rate of the resin. If necessary, wax at a concentration of about 1% by weight (a 5% solution of paraffin in styrene) may be included to eliminate tackiness of the set resin. Also, about 5% acetone may be added to the mixture to reduce viscosity, if desired.

The blended mixture of resin, lubricant and friction enhancer, together with catalysts and other modifiers, is transported via a mixing tube into open moulds which are on a conveyor system. When filled, the moulds are moved through a curing over to accelerate the cure time of the product. The cured product is then dropped out of the moulds, which are inverted, and packaged for delivery to customers.

If thermoplastic resins are used the blended mixture of resins, lubricant and friction enhancer may be injection moulded, generally at temperatures in the range of 180 C. to 200 C. at two to three atmospheric pressure, into a cured final product of any desired shape determined by the injection mould.

The solid lubricant is typically molydbenum disulphide or graphite. The friction modifier is preferably a naturally occurring mineral, but certain synthetic minerals of satisfactory particle size can also be used. The particle size of the friction modifier can be in the order of 0.5 microns to 5 microns. Preferably, the particle size is about 1 micron to 2 microns.

EXAMPLE 2

A friction modifier composition was prepared as described above using the following components:

|  | % by weight |
|---|---|
| Fire retardant Brominated Isophthalic Polyester Resin | 59.80% |
| Molybdenum Disulphide | 10.00% |
| Talc 44-26 | 30.00% |
| 12% Cobalt Naphthenate (promoter used to speed up gel time) | 0.16% |
| n, n-dimethylaniline (promoter used to improve cure rate) | 0.04% |
|  | 100.00% |

After mixing as described above 1.45% of methylethylketone peroxide was added to initiate the polymerisation reaction.

The friction modifier composition was tested and found to produce a positive steel to steel friction characteristic in the range of 0 to 0.45 as the relative speed of sliding (creepage) increased from zero to about 2.5%, rising to about 0.48 as creepage increased to about 30%. These coefficient of friction levels are substantially above steel to steel friction coefficient levels obtained with conventional lubricants and above those of the lubricant composition of our aforesaid PCT Application No. 90/00878.

When applied to the surfaces of a rail or a wheel tread the composition was found to alleviate the initiation and development of short pitch corrugations, and noise originating from frictional oscillations in the rail-wheel interface was appreciably reduced. Tests indicate a very substantial degree of traction and adhesion improvement on incline systems and in relation to braking and adhesion in general.

The steel to steel coefficient of friction produced by use of fiction modifier compositions according to the invention should preferably increase from about zero to 0.45 as creepage increases from zero to about 2.5% and from 0.45 to about 0.50 or 0.55 as creepage increased from about 2.5% to about 30%. In contrast to the compositions of our aforesaid International Application No. 90/00878, the steel to steel coefficient of friction produced by the composition under all such conditions is preferably substantially in excess of 0.3.

In the friction modifier compositions of the present invention the solid lubricant and the friction modifier are preferably present in the composition in a ratio of about 1:3. The quantities of the two components may differ from this ratio, up to about 5%, without affecting the performance characteristics of the composition.

The compositions described produce very substantial advantages when used in steel to steel sliding situations. When introduced into the rail-wheel tread interface of rail transportation systems in appropriate quantities the compositions will reduce noise and at the same time permit the rail vehicle to make the best use of power in providing for increased traction and assist in acceleration and braking. In addition wheel-rail wear is reduced both through the lubricating effect produced after initiation of sliding but primarily through reducing the tendency to slip as a result of the substantial and rapid increase in frictional resistance at low creepage levels.

Various modifications may be made without departing from the invention. For example, the nature and proportions of the constituents incorporated in the composition may be varied considerably provided the resultant composition produces the substantial and rapid increase in coefficient of friction at low creepage levels which produces the benefits referred to above. Moreover while the composition has been described primarily as suitable for use with steel rail-steel wheel transport systems, compositions according to the invention may also be employed in other situations where the performance benefits are advantageous.

It is understood that the invention has been disclosed herein in connection with certain examples and embodiments. However such changes, modifications or equivalents as can be used by those skilled in the art are intended to be included. Accordingly the disclosure is to be construed as exemplary, rather than limiting, and such changes within the principles of the invention as are obvious to one skilled in the art are intended to be included within the scope of the claims.

The embodiments of the invention in which an exclusive property or privilege is claimed are defined as follows:

1. A high positive friction modifier composition comprising:
    (a) at least 20% by weight of a polymer resin media;
    (b) at least 5% by weight of a solid lubricant
    (c) at least 15% by weight of a friction enhancer.
    wherein there is produced a coefficient of friction which increases to about 0.20 at creepage levels up to 2.5% between steel bodies in rolling-sliding contact lubricated using the said composition.

2. The composition according to claim 1, wherein the composition is such that the coefficient of friction continues to increase at creepage levels above 2.5% at least to 10% creepage.

3. The composition according to claim 2, wherein the composition is such that the coefficient of friction continues to increase at creepage levels at least to 30% creepage.

4. The composition according to claim 1, wherein the composition is such that the coefficient of friction increases to above 0.40 at creepage levels up to 2.5%.

5. The composition according to claim 4, wherein the composition is such that the coefficient of friction increases from about 0 to 0.45 as creepage increases from 0 to about 2.5% and from 0.45 to about 0.55 as creepage increased from about 2.5% to about 30%.

6. The composition according to claim 1, wherein said composition comprising:
    (a) 20-80% by weight of a polymer media;
    (b) 5-20% by weight of a solid lubricant; and (c) 15-60% by weight of a powderized solid mineral friction enhancer;

wherein the solid lubricant and the friction enhancer are present in a ratio of about 1:1.8 to 1:3.

7. The composition according to claim 7, wherein the solid lubricant and the friction enhancer are present in a ratio of about 1:2 to 1:3.

8. The composition according to claim 7, wherein the solid lubricant and the friction enhancer are present in a ratio of about 1:3.

9. The composition according to claim 6, wherein said composition comprising:

(a) 40-70% by weight of a polymer media;
(b) 7.5-15% by weight of a solid lubricant; and
(c) 22.5-45% by weight of a powderized solid mineral friction enhancer.

10. The composition according to claim 9, wherein the polymer media is selected from the group consisting of epoxy ester resin, polyurethane resin; polyurethane-acrylic resin; polyester resin; polyethylene resin and polypropylene resin.

11. The composition according to claim 9, wherein the solid lubricant is selected from the group consisting of molybdenum disulphide and graphite.

12. The composition according to claim 9, wherein the powderized mineral friction enhancer is selected from the group consisting of calcium carbonate, magnesium silicate, magnesium carbonate, bentonite, coal dust, barium sulphate, powderized asbestos, aluminum silicate, silica, amorphous silica, synthetic silica, natural silica, slate powder, diatomaceous earth, ground quartz, zinc stearate, aluminium stearate, zinc oxide, antimony oxide, dolomite, lead carbonate, calcium sulphate, lead oxide, naphthalene synemite and powderized polyethylene fines.

13. The composition according to claim 9, wherein the polymer media comprises at least forty per cent by weight of the composition.

14. The composition according to claim 9, wherein the solid lubricant and the friction modifier are present in the composition in a 1:3 ratio±2.5% by weight.

15. The composition according to claim 9, wherein the friction modifier has a particle size in the range of about 0.5 microns to about 5 microns.

16. The composition according to claim 15, wherein the friction modifier has a particle size in the range of about 1 micron to about 2 microns.

17. The composition according to claim 10 wherein the polyester resin media is orthophthalic.

18. The composition according to claim 10, wherein the polyester resin media is isophthalic.

19. A high and positive friction modifier composition comprising:

(a) about 60% by weight of a polyester resin media;
(b) about 10% by weight of molybdenum disulphide solid lubricant; and
(c) about 30% by weight of powderized talc (magnesium silicate) such that the resulting coefficient of friction of the said composition ranges from about 0.45 to about 0.55 as creepage levels increase from about 2.5% to about 30% between steel bodies in rolling-sliding contact lubricated using the said composition.

20. The composition according to claim 19 further comprising catalysts selected from the group consisting of cobalt naphthenate, n, n-dimethylaniline and methyl ethyl ketone peroxide.

21. A method of reducing noise and wear in a steel wheel—steel rail system and countering the occurance of slippage comprising applying to the surface of the wheel tread and/or the rail a friction modifier composition as described in claim 1, effective to change the negative coefficient of friction between the rail and the wheel to a positive coefficient of friction.

* * * * *

UNITED STATES PATENT AND TRADEMARK OFFICE
CERTIFICATE OF CORRECTION

PATENT NO. : 5,308,516
DATED : May 3, 1994
INVENTOR(S) : Chiddick

It is certified that error appears in the above-identified patent and that said Letters Patent is hereby corrected as shown below:   In the Drawings:

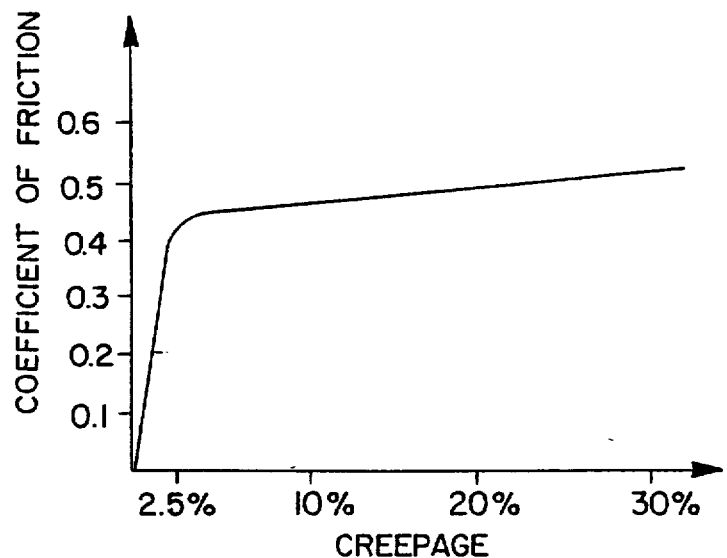

FIG.I

Signed and Sealed this

Eighteenth Day of October, 1994

Attest:

BRUCE LEHMAN

Attesting Officer

Commissioner of Patents and Trademarks